United States Patent
Nejedly et al.

(10) Patent No.: US 12,320,367 B2
(45) Date of Patent: Jun. 3, 2025

(54) TURBOMACHINE WITH COOLANT JACKET AND TURBULATOR INSERT MEMBER

(71) Applicant: Garrett Transportation I Inc., Torrance, CA (US)

(72) Inventors: Milan Nejedly, Brno (CZ); Sanketh, Bengaluru (IN); Daniel Turecek, Ostopovice (CZ); Vit Houst, Sestajovice (CZ)

(73) Assignee: GARRETT TRANSPORTATION I INC., Torrance, CA (US)

( * ) Notice: Subject to any disclaimer, the term of this patent is extended or adjusted under 35 U.S.C. 154(b) by 36 days.

(21) Appl. No.: 18/184,756

(22) Filed: Mar. 16, 2023

(65) Prior Publication Data
US 2024/0255004 A1    Aug. 1, 2024

(30) Foreign Application Priority Data
Feb. 1, 2023  (IN) .............................. 202311006628

(51) Int. Cl.
*F04D 29/58*    (2006.01)
*H02K 5/20*    (2006.01)

(52) U.S. Cl.
CPC ......... *F04D 29/582* (2013.01); *F04D 29/584* (2013.01); *F04D 29/588* (2013.01); *H02K 5/203* (2021.01)

(58) Field of Classification Search
CPC .... F04D 29/584; F04D 29/582; F04D 29/588; H02K 5/203
See application file for complete search history.

(56) References Cited

U.S. PATENT DOCUMENTS

| | | | | |
|---|---|---|---|---|
| 3,009,072 A | * | 11/1961 | Mossay | H02K 1/32 310/64 |
| 5,616,973 A | * | 4/1997 | Khazanov | F04D 29/5806 310/58 |
| 6,200,108 B1 | * | 3/2001 | Caudill | F04D 29/5806 165/47 |
| 6,909,210 B1 | * | 6/2005 | Bostwick | H02K 5/203 310/58 |
| 6,960,851 B2 | * | 11/2005 | Poulin | H02K 9/22 310/52 |

(Continued)

*Primary Examiner* — Christopher S Bobish
(74) *Attorney, Agent, or Firm* — Lorenz & Kopf, LLP (57) ABSTRACT

A turbomachine includes a fluid compressor section with a compressor wheel supported on a shaft and a compressor housing that houses the compressor wheel for rotation therein about an axis of rotation. The turbomachine also includes an e-machine section with an e-machine operatively connected to the shaft and configured to convert energy between the e-machine and the shaft as the shaft rotates. The e-machine section includes an e-machine housing that houses at least part of the e-machine. The turbomachine further includes a coolant jacket that is defined at least partly in the e-machine housing. The coolant jacket is configured to receive a fluid coolant flow therein for cooling the e-machine. Also, the turbomachine includes a turbulator insert member that is removably received within the coolant jacket and that sub-divides the coolant jacket for directing the fluid coolant flow through the coolant jacket.

20 Claims, 9 Drawing Sheets

(56) References Cited

U.S. PATENT DOCUMENTS

| | | | | |
|---|---|---|---|---|
| 6,992,411 | B2* | 1/2006 | Houle | H02K 1/20 |
| | | | | 310/58 |
| 7,009,317 | B2* | 3/2006 | Cronin | H02K 5/203 |
| | | | | 310/52 |
| 10,270,315 | B2* | 4/2019 | Desbiens | H02K 5/203 |
| 10,566,873 | B2* | 2/2020 | Ishikawa | H02K 5/06 |
| 10,941,788 | B2* | 3/2021 | Iizuka | F04D 17/10 |
| 11,715,987 | B2* | 8/2023 | Ishikawa | H02K 9/19 |
| | | | | 310/88 |
| 11,732,638 | B2* | 8/2023 | Houst | F04D 29/5806 |
| | | | | 415/122.1 |
| 11,788,552 | B2* | 10/2023 | Iizuka | F04D 29/628 |
| | | | | 418/83 |
| 2004/0124720 | A1* | 7/2004 | Condamin | H02K 5/24 |
| | | | | 310/51 |
| 2008/0185924 | A1* | 8/2008 | Masoudipour | H02K 5/203 |
| | | | | 29/890.035 |
| 2014/0354089 | A1* | 12/2014 | Chamberlin | H02K 5/203 |
| | | | | 310/54 |
| 2015/0308456 | A1* | 10/2015 | Thompson | F04D 17/12 |
| | | | | 417/244 |
| 2017/0271956 | A1* | 9/2017 | Hanumalagutti | H02K 9/197 |
| 2019/0345956 | A1* | 11/2019 | Iizuka | F04D 25/0606 |
| 2020/0067374 | A1* | 2/2020 | Li | H02K 5/203 |
| 2021/0293254 | A1* | 9/2021 | Chavez Castellanos | |
| | | | | H02K 5/203 |
| 2021/0359571 | A1* | 11/2021 | Yoo | B22D 15/02 |
| 2024/0275231 | A1* | 8/2024 | Taki | B22C 9/24 |

* cited by examiner

TURBOMACHINE WITH COOLANT JACKET AND TURBULATOR INSERT MEMBER

CROSS REFERENCE TO RELATED APPLICATION

This application claims the benefit and priority of Indian provisional patent application 202311006628, filed Feb. 1, 2023. The entire disclosure of the above application is incorporated herein by reference.

TECHNICAL FIELD

The present disclosure generally relates to a turbomachine and, more particularly, relates to a turbomachine with a coolant jacket and turbulator insert member.

BACKGROUND

Some vehicles include a turbocharger, supercharger, and/or other turbomachine for boosting the performance of an internal combustion engine. More specifically, these devices can increase the engine's efficiency and power output by forcing extra air into the combustion chamber of the engine. Turbomachines are provided in other systems as well, such as fuel cell systems, generator systems, etc.

Excessive heat can detrimentally affect operations of a turbomachine. The turbomachine itself may generate heat and/or the turbomachine may operate in hot environments. Some turbomachines may include cooling features for maintaining temperatures within a desirable range. However, the cooling features may disadvantageously increase the size and weight of the turbomachine. Furthermore, the cooling features may increase manufacturing complexity and costs.

Thus, it is desirable to provide a turbomachine that has effective cooling features and that is compact and relatively lightweight. Furthermore, it is desirable to provide a turbomachine with cooling features that can be manufactured with efficiency and cost effectiveness. Other desirable features and characteristics of the present disclosure will become apparent from the subsequent detailed description and the appended claims, taken in conjunction with the accompanying drawings and this background discussion.

BRIEF SUMMARY

In one embodiment, a turbomachine is disclosed that includes a fluid compressor section. The fluid compressor section includes a compressor wheel supported on a shaft and a compressor housing that houses the compressor wheel for rotation therein about an axis of rotation. The turbomachine also includes an e-machine section with an e-machine operatively connected to the shaft and configured to convert energy between the e-machine and the shaft as the shaft rotates. The e-machine section includes an e-machine housing that houses at least part of the e-machine. The turbomachine further includes a coolant jacket that is defined at least partly in the e-machine housing. The coolant jacket is configured to receive a fluid coolant flow therein for cooling the e-machine. Also, the turbomachine includes a turbulator insert member that is removably received within the coolant jacket and that sub-divides the coolant jacket for directing the fluid coolant flow through the coolant jacket.

In another embodiment, a method of manufacturing a turbomachine is disclosed that includes coupling a fluid compressor section and an e-machine section. The fluid compressor section includes a compressor wheel supported on a shaft and a compressor housing that houses the compressor wheel for rotation therein about an axis of rotation. The e-machine section includes an e-machine operatively connected to the shaft and configured to convert energy between the e-machine and the shaft as the shaft rotates. The e-machine section includes an e-machine housing that houses at least part of the e-machine. The method also includes defining a coolant jacket at least partly in the e-machine section. The coolant jacket is configured to receive a fluid coolant flow therein for cooling the e-machine. Furthermore, the method includes inserting a turbulator insert member removably within the coolant jacket. The turbulator insert member sub-divides the coolant jacket for directing the fluid coolant flow through the coolant jacket.

In an additional embodiment, a motorized compressor device is disclosed. The motorized compressor device includes a fluid compressor section with a compressor wheel supported on a shaft and a compressor housing that houses the compressor wheel for rotation therein about an axis of rotation. The motorized compressor device also includes a motor section with an electric motor operatively connected to the shaft and configured to drivingly rotate the shaft. The motor section includes a motor housing that houses at least part of the electric motor. Furthermore, the motorized compressor device includes a coolant jacket that is defined at least partly in the motor housing. The coolant jacket is configured to receive a fluid coolant flow therein for cooling the electric motor. The coolant jacket is defined by a first support surface and a third support surface. Also the motorized compressor device includes a turbulator insert member that is removably received within the coolant jacket and that sub-divides the coolant jacket for directing the fluid coolant flow through the coolant jacket. The turbulator insert member includes a second support surface and a fourth support surface. The second support surface abuts the first support surface, and the fourth support surface abuts the third support surface to secure the turbulator insert member within the coolant jacket. The first and second support surfaces face in opposite radial directions with respect to the axis, and the third and fourth support surfaces face in opposite circumferential directions with respect to the axis.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include an improved turbomachine with an integrated e-machine and a cooling system. The turbomachine may, for example, be an electric-motor-assisted fluid compressor device, an electric supercharger, a hybrid turbocharger, as an e-charger assembly, e-turbo, e-assist charging device, or other related component. The turbomachine and methods of manufacturing the same are disclosed.

The cooling system may include a cooling jacket defined within a housing of the turbomachine. To intensify and improve the cooling effect, a turbulator insert member (i.e., turbulator or turbulator member) may be removably disposed within the cooling jacket. The turbulator may disrupt and turbulate flow (i.e., increase turbulent flow) from a coolant inlet into the jacket to a coolant outlet. The turbulator may be shaped so as to define at least one predetermined flow path from the inlet to the outlet. The turbulator may be shaped to provide desirable coolant flow characteristics. As such, the cooling system may efficiently and effectively cool the e-machine, bearings, electronics components, etc. of the turbomachine.

The turbulator insert member may include various features for securing into a substantially fixed position within the cooling jacket. There may be at least one surface of the turbulator that abuts a corresponding surface within the coolant jacket to secure the turbulator in position. The coolant jacket may be defined by particular features that secure the turbulator in position therein.

Furthermore, in some embodiments, the turbulator may be formed to include or at least partly define an aperture. The aperture may be a groove, hole, slot, notch, or other void that is defined through the turbulator. The aperture may define a fluid passage for the coolant to flow from one area of the coolant jacket to another. In other words, the aperture may fluidly connect these areas of the coolant jacket.

Accordingly, a coolant flow may flow from the inlet, through the coolant jacket, and to an outlet to remove heat (e.g., from the stator of a motor, from electronics components, from one or more housing members, from one or more bearing components, or from other areas proximate the coolant jacket). The coolant may be directed by the turbulator from the inlet to the outlet for effectively removing heat from the turbomachine. The turbulator insert member may be incorporated without significantly increasing size, weight, etc. of the turbomachine. Additionally, manufacturing methods of the present disclosure can be employed for forming the turbomachine efficiently, accurately, and repeatably in a high-volume manufacturing environment.

Figure 1:
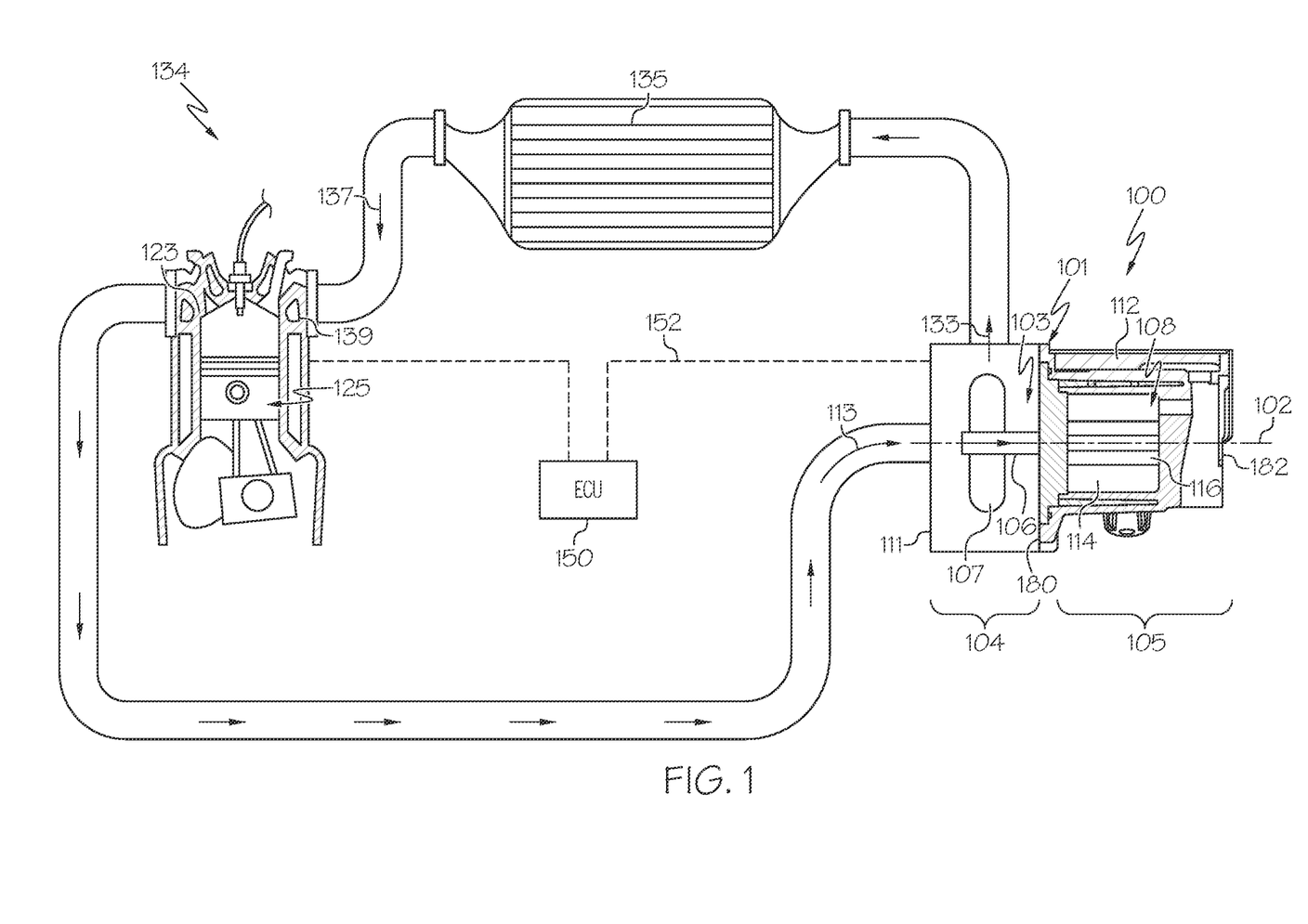
FIG. 1 is a schematic view of a vehicle engine system, which includes a turbomachine according to example embodiments of the present disclosure.

FIG. 1 is a schematic view of an example turbomachine 100 that incorporates features of the present disclosure. Generally, the turbomachine 100 may include a housing 101 and a rotating group 103 that is supported therein. The rotating group 103 is supported by a bearing system to rotate within the housing 101 about an axis 102 of rotation.

The turbomachine 100 may include a fluid compressor section 104 that is coupled with an e-machine section (e.g., a motor section 105). A shaft 106 of the rotating group 103 may extend along the axis 102 between the fluid compressor section 104 and motor section 105.

Figure 2:
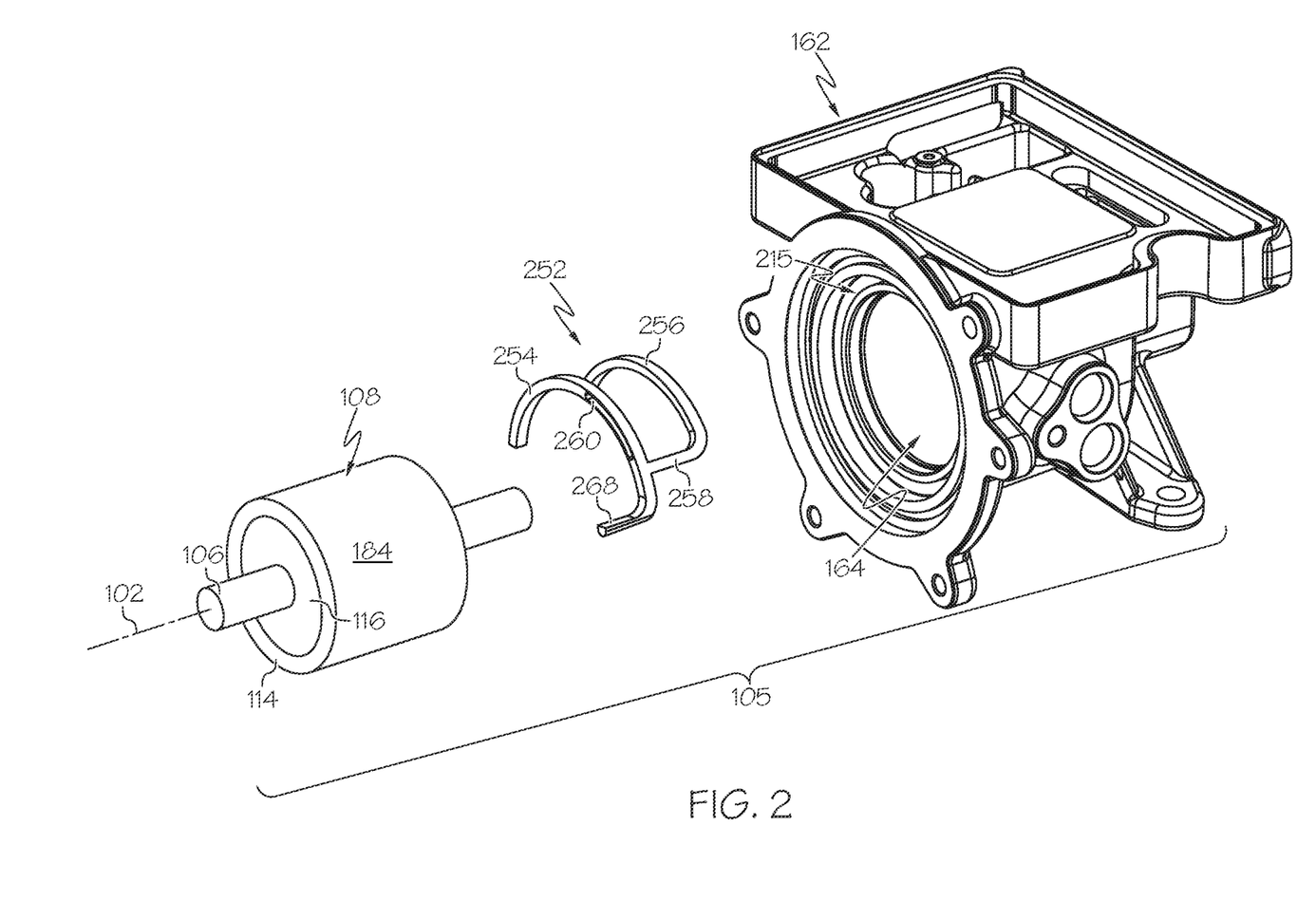
FIG. 2 is an exploded perspective view of the turbomachine of FIG. 1 according to example embodiments of the present disclosure.

The compressor section 104 may include a compressor wheel 107 that is mounted on the shaft 106. The compressor section 104 may also include a compressor housing 111 that houses the compressor wheel 107. The motor section 105 may include an electric motor 108 that is supported within a motor housing 112 of the housing 101. The motor 108 may include a stator member 114 and a rotor member 116 as schematically shown in FIG. 2. The stator member 114 may be supported in the motor housing 112, and the rotor member 116 may be mounted on the shaft 106. A first end 180 of the motor housing 112 may be attached to the compressor housing 111 and may extend axially away from the compressor section 104. The motor section 105 may terminate at a second end 182 of the motor housing 112 such that the compressor section 104 and motor section 105 are arranged axially end-to-end.

The motor 108 may be configured to drivingly rotate the shaft 106 and the compressor wheel 107. The compressor section 104 may receive an inlet air flow 113 and may output a pressurized air stream 133 to a downstream component. In some embodiments, the turbomachine 100 may be provided within a vehicle. Due to the compression process, the pressurized air stream 133 is characterized by an increased temperature, over that of the input air flow 113. The air stream 133 may be channeled through an air cooler 135 (i.e., an intercooler), such as a convectively cooled charge air cooler. The air cooler 135 may be configured to dissipate heat from the air stream 133, increasing its density. The resulting cooled and pressurized air stream 137 is channeled into an intake manifold 139 of an internal combustion engine 134, or alternatively, into a subsequent-stage, in-series compressor.

The operation of the system may be controlled by an ECU 150 (engine control unit) that connects to the remainder of the system via communication connections 152. The ECU 150 may control operations of the motor 108 in some embodiments (e.g., control the speed of the motor 108), and/or may control operations of the engine 134, etc.

It will be appreciated that the term "turbomachine" as used herein is to be interpreted broadly, for example, to include devices with an electrically driven compressor wheel regardless of where the e-charging device is incorporated, the type of system in which the e-charging device is incorporated, etc. It will also be appreciated that the e-charging device of the present disclosure may also be referred to as an electrically driven compressor assembly, e-boosting device, electric supercharger, e-turbo, or other related component. Features of the present disclosure may also be configured as another turbomachine, such as an e-assisted turbocharger, or other related component. Furthermore, in some embodiments, the motor section 105 may be configured as a variety of e-machines, including at least one that is operable in an electric generator mode such that the section 105 may generate electric energy from the rotational energy of the shaft 106.

Referring now to FIG. 2, the motor section 105 is shown in greater detail according to example embodiments. The motor 108 is shown schematically and may be generally barrel-shaped. The shaft 106 may extend axially from one or both ends of the motor 108.

Figure 3:
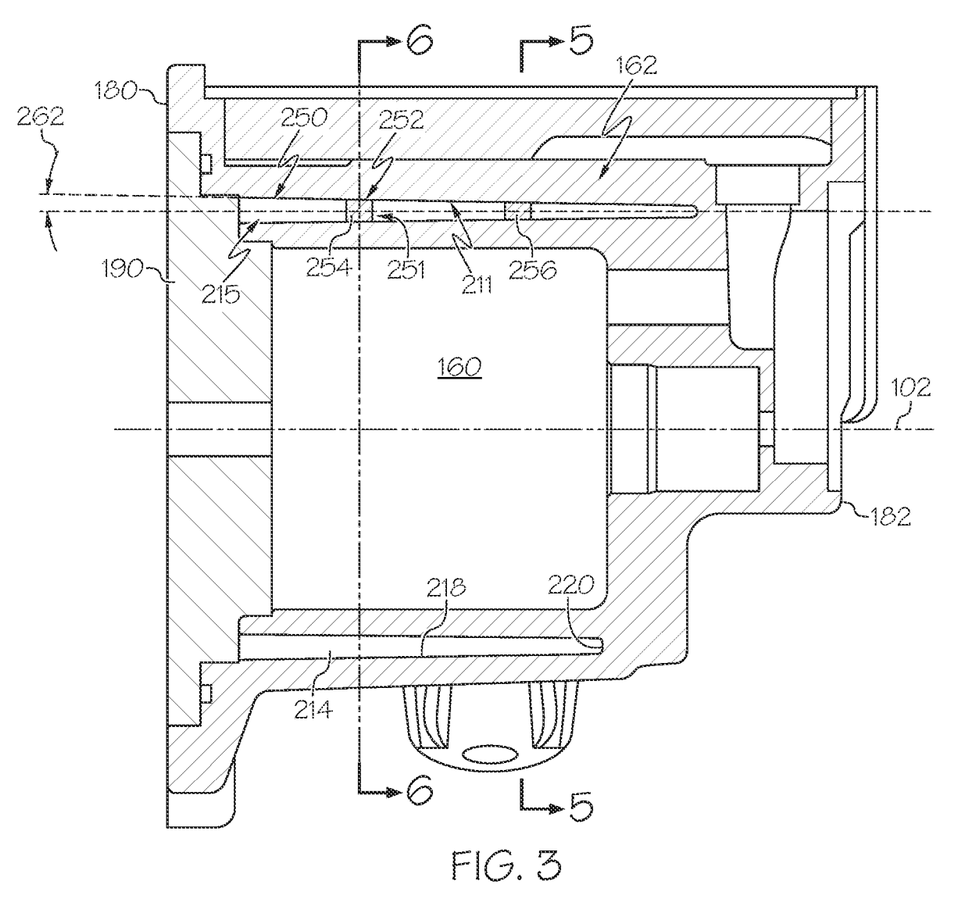
FIG. 3 is a longitudinal cross-sectional view of the turbomachine of FIG. 2.

The motor housing 112 may include an outer housing member 162 and an end cap 190 (FIG. 3). As shown in FIGS. 2 and 3, the outer housing member 162 may be a hollow block that includes a core opening 164 centered on the axis 102. The core opening 164 may receive and cover the motor 108 at the second end 182 and at an outer radial side 184 of the motor 108. The end cap 190 may be flat and plate-like. The end cap 190 may be joined to the outer housing member 162 at the first end 180 to close off the core opening 164 and to cover over the motor 108. Alternatively, instead of the end cap 190, the compressor housing 111 or another part may be joined to the outer housing member 162 at the first end 180 to cover over the end of the motor 108.

As such, the motor housing 112 (e.g., the outer housing member 162 and the end cap 190) may cooperatively define a motor cavity 160. The motor cavity 160 may be shaped to receive, house, and support the motor 108. The motor cavity 160 may be shaped so as to snugly receive the motor 108 therein.

The motor housing 112 may be manufactured and formed in a number of ways without departing from the scope of the present disclosure. For example, the outer housing member 162 may be a cast part that is formed by a known casting process. One or more features (e.g., holes, bores, etc.) of the outer housing member 162 may be machined from the cast part in some embodiments. The end cap 190 may be formed, for example, in stamping process, via machining, or otherwise.

Furthermore, the turbomachine 100 may include a cooling system 250 (FIGS. 3 and 5-9). The cooling system 250 may include a plurality of fluid channels, reservoirs, passages, circuits, etc. that receive at least one flow of coolant along a flow path (represented, for example, by arrows 206 in FIGS. 7, 8, and 9). A liquid coolant, such as ethylene, may move along the flow path 206 for cooling the motor 108, bearings, electronic components, and/or other components of the turbomachine 100.

Figure 7:
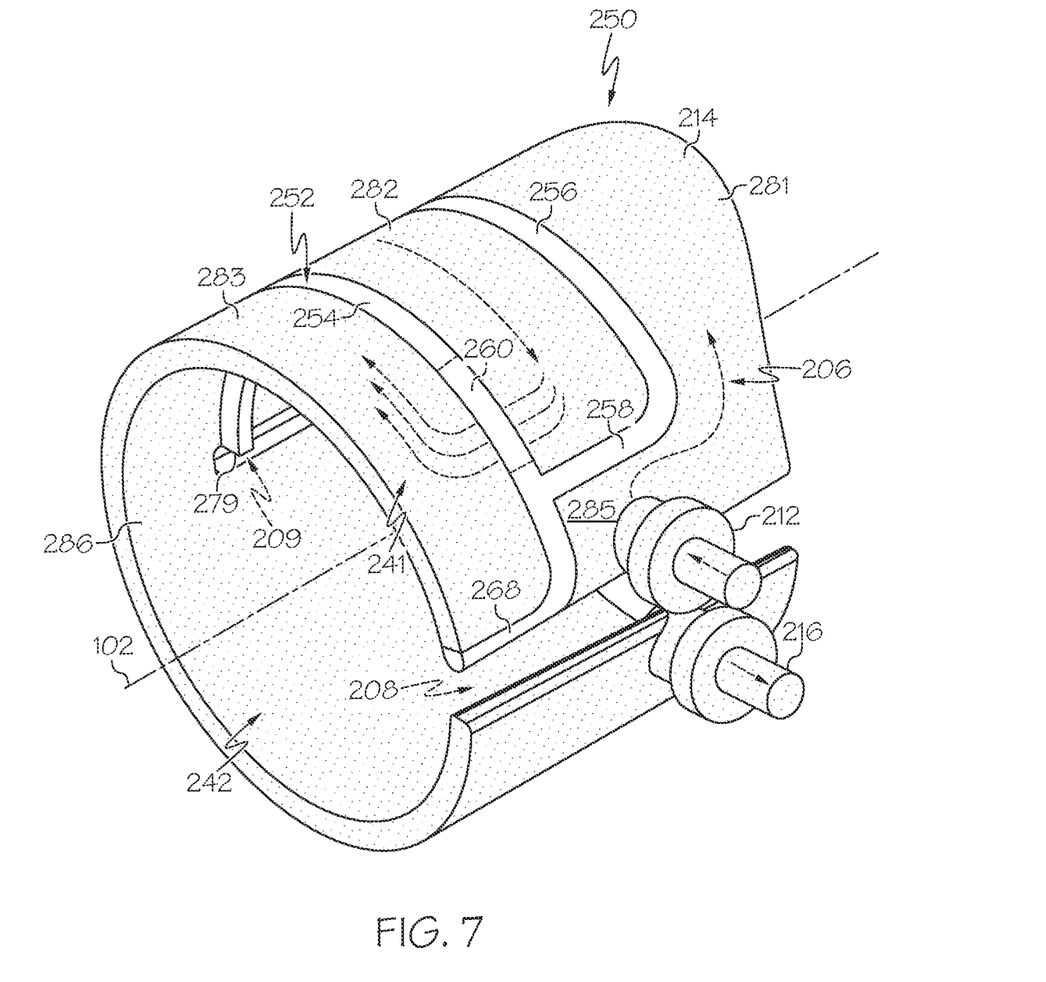
FIG. 7 is a front perspective view of the turbulator insert member illustrating flow through a coolant jacket of the turbomachine of FIGS. 1-3 and 5-6.

The cooling system 250 may include a coolant jacket 214. The coolant jacket 214 may be defined within the motor housing 112 and may surround (i.e., jacket) the motor cavity 160 and the motor 108 therein. As shown in FIG. 7, the cooling system 250 may also include a fluid inlet 212 into the coolant jacket 214 and a fluid outlet 216 from the coolant jacket 214. The inlet 212 may be fluidly connected to the coolant jacket 214 to provide the coolant thereto. The outlet 216 may be fluidly connected to the coolant jacket 214 to receive the coolant therefrom.

The coolant jacket 214 may be shaped and configured in a number of ways without departing from the scope of the present disclosure. The coolant jacket 214 is represented according to example embodiments in FIGS. 3 and 5-9. As shown, the coolant jacket 214 may be substantially arcuate and may extend in a circumferential direction about the axis 102. Also, the coolant jacket 214 may be elongate and extended along the axis 102. The coolant jacket 214 may be substantially centered on the axis 102. The jacket 214 may be disposed at a radius greater than that of the outer diameter of the core opening 164.

In some embodiments, the coolant jacket 214 may be substantially defined by a split annular opening 215 in the outer housing member 162 of the motor housing 112. In other words, the opening 215 may be defined by a plurality of internal surfaces 211 (FIGS. 3, 5, and 6) within the outer housing member 162. A majority of the internal surfaces 211 may face substantially in the radial direction so as to define radial internal surfaces 218 (FIG. 3). Some of the radial internal surfaces 218 may face inward toward the axis 102 while other radial internal surfaces 218 may face outward from the axis 102. Additional internal surfaces 211 proximate the second end 182 may face axially so as to define axial internal surfaces 220 (FIG. 3). Further internal surfaces 211 may face in the circumferential direction so as to define circumferential internal surfaces 222 (FIGS. 5 and 6).

Figure 5:
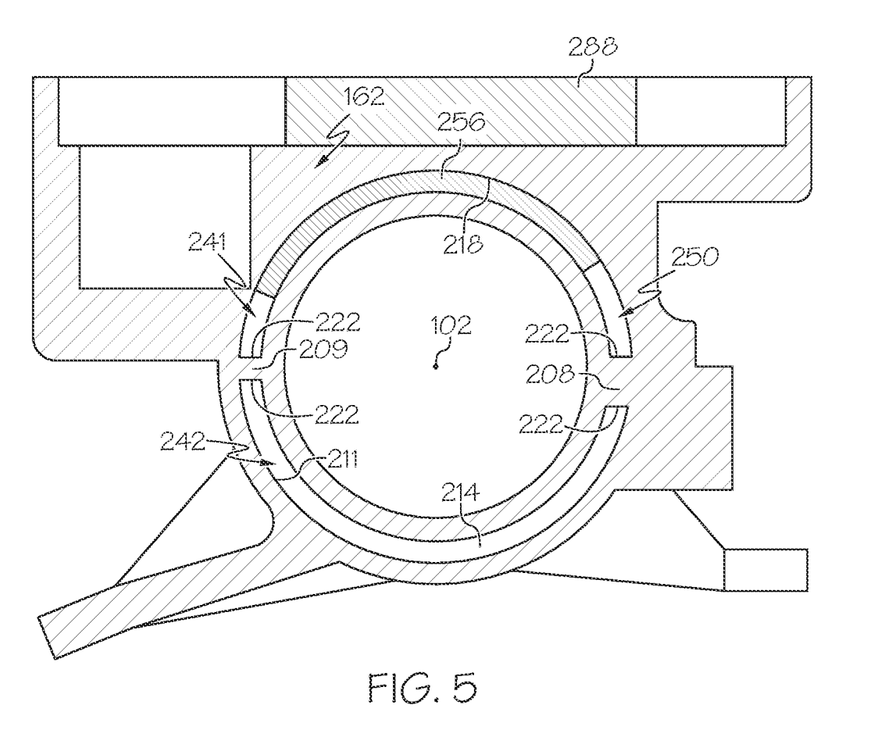
FIG. 5 is an axial cross-sectional view of the turbomachine of FIG. 3 taken along the line 5-5.
Figure 6:
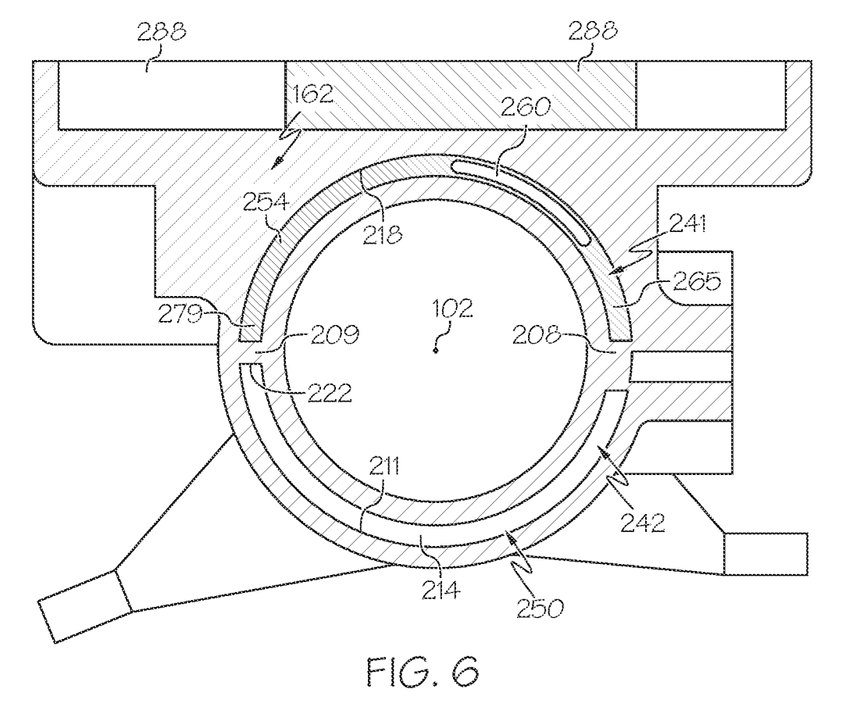
FIG. 6 is an axial cross-sectional view of the turbomachine of FIG. 3 taken along the line 6-6.
Figure 8:
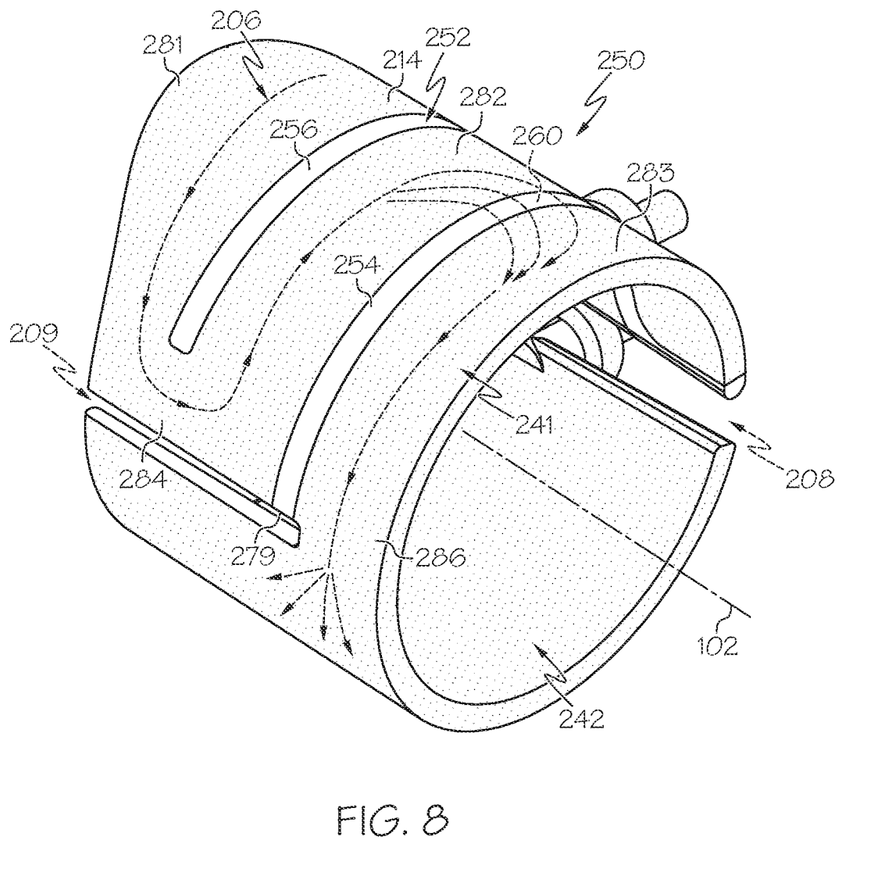
FIG. 8 is a back perspective view of the turbulator insert member illustrating flow through the coolant jacket of the turbomachine of FIGS. 1-3 and 5-6.

As shown in FIGS. 5 and 6, the outer housing member 162 may also include a first rail 208 and a second rail 209, which may be elongate and may extend along (e.g., parallel) to the axis 102. The first rail 208 and the second rail 209 may be spaced apart in the circumferential direction about the axis 102. The first rail 208 and the second rail 209 may be spaced apart approximately one-hundred-eighty degrees (180°) about the axis 102. The first rail 208 may extend along an entire axial length of the coolant jacket 214 and may extend between the inlet 212 and the outlet 216 as indicated in FIG. 7. The second rail 209 may extend partly along the axial length of the coolant jacket 214 as indicated in FIG. 8. The first rail 208 and the second rail 209 may define circumferential internal surfaces 222 of the coolant jacket 214. Accordingly, the first rail 208 and the second rail 209 may divide the coolant jacket 214 into a first side portion 241 and a second side portion 242 (FIGS. 5 and 6). The first side portion 241 may be semi-circular and positioned on one side (e.g., a top side) of the axis 102 while the second side portion 242 may be semi-circular and positioned on the opposite side (e.g., a bottom side) of the axis 102.

As shown in FIG. 3, the end cap 190 may attach to the outer housing member 162. The end cap 190 may, as such, close off the split annular opening 215 in the outer housing member 162. Accordingly, in some embodiments, the end cap 190 may partly define part of the coolant jacket 214.

Figure 4:
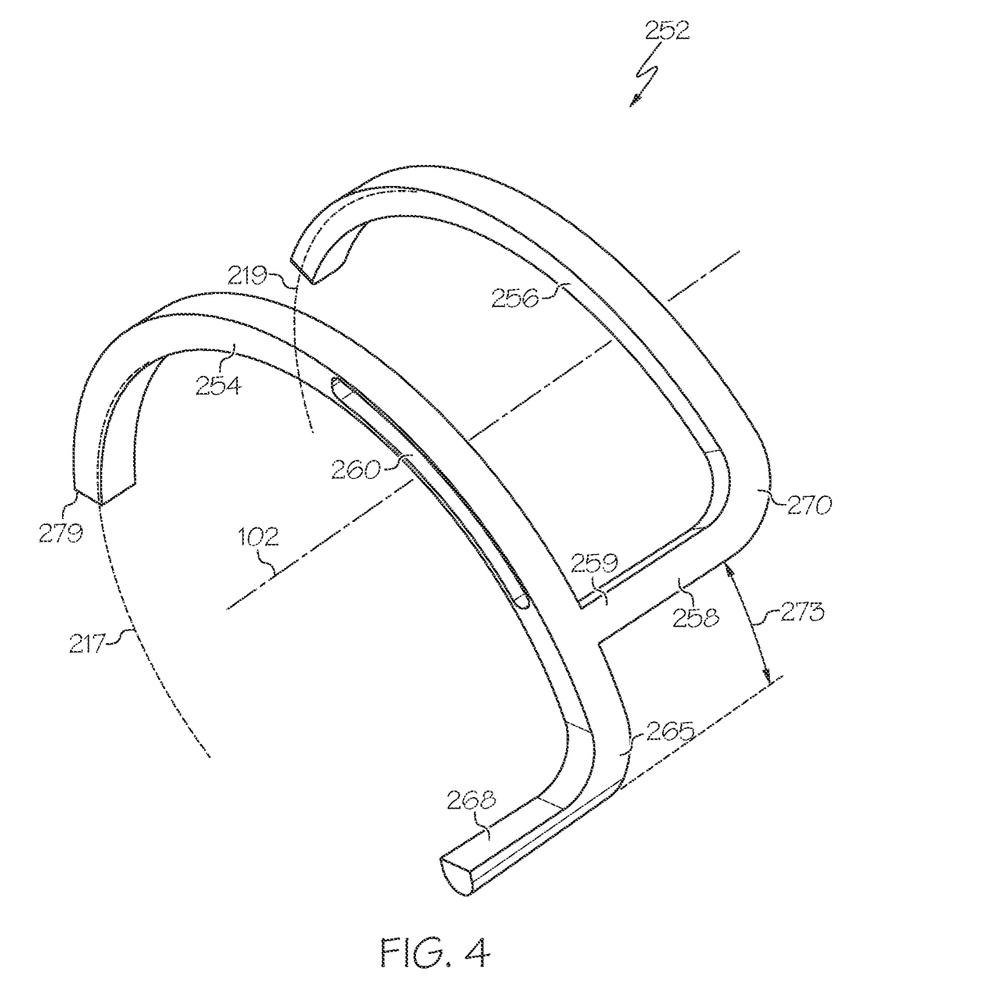
FIG. 4 is a perspective view of a turbulator insert member of the turbomachine of FIG. 2.

The turbomachine 100 may further include a turbulator insert member 252. As shown in FIG. 4, the turbulator insert member 252 may include a plurality of substantially rigid, thin, elongate members (i.e., arm-like, finger-like, or branch-like members, etc.) that extend, curve, and branch away from each other.

Specifically, in some embodiments, the turbulator insert member 252 may include a first arcuate barrier member 254 and a second arcuate barrier member 256. The first arcuate barrier member 254 may be elongate and may extend along a respective first branch axis 217. The second arcuate barrier member 256 may be similar and may extend along a second branch axis 219. One or both branch axes 217, 219 may extend arcuately about the axis of rotation 102 and may be substantially centered thereon. The arcuate barrier members 254, 256 may extend at least seventy degrees (70°) about the axis 102.

The first arcuate barrier member 254 and the second arcuate barrier member 256 may be connected by a spine 258 extending therebetween. The spine 258 (i.e., an axial barrier member) may extend along (e.g., parallel) to the axis 102 to connect the arcuate barrier members 254, 256, which are positioned separated at a distance along the axis 102. An end 259 of the spine 258 may be fixed to the first arcuate barrier member 254. The turbulator insert member 252 may further include an axial branch 268 that extends along (e.g., parallel) to the axis 102 from the first arcuate barrier member 254. The axial branch 268 and the spine 258 may extend in opposite axial directions from the first arcuate barrier member 254. While the axial branch 268 may extend from an end 265 of the first arcuate barrier member 254, the end 259 may be spaced circumferentially from the end 265 by an angle 273.

An example cross sectional profile 251 of the turbulator insert member 252 taken perpendicular to the first and second branch axes 217, 219 is shown in FIG. 3. As shown, the first arcuate barrier member 254 and/or the second arcuate barrier member 256 may have a substantially quadrilateral cross sectional profile. The cross sectional profile of the turbulator insert member 252 may vary along its length. As shown in FIG. 4, the axial branch 268 may terminate with a semi-circular cross sectional profile taken perpendicular to the axis 102. Thus, the turbulator insert member 252 may include at least one flat side (i.e., at least one straight side) in its cross sectional profile. The turbulator insert member 252 cross sectional profile may be at least partly rounded.

Furthermore, the turbulator insert member 252 may also include an aperture 260. The aperture 260 may be a through-hole, slot, slit, or other opening that provides passage through the turbulator insert member 252. As shown in FIGS. 4 and 6, the first arcuate barrier member 254 may comprise a through-hole with an ovate cross sectional profile that defines the aperture 260. The aperture 260 may arcuately bend with the curvature of the first arcuate barrier member 254 about the axis 102. The aperture 260 may be directed along the axis and through the first arcuate barrier member 254 to allow flow through the first arcuate barrier member 254. The angular position of the aperture 260 may be proximate the spine 258, but on an opposite circumferential side of the spine 258 from the end 265.

Different features may be joined by smooth and continuous surfaces. For example, a junction 270 of the second arcuate barrier member 256 may be contoured and smooth as it bends between the axial and circumferential directions, as shown in FIG. 4. Likewise, the end 265 may be substantially contoured, continuous, and smooth as it extends to connect to the axial branch 268.

In some embodiments, the turbulator insert member 252 may be a unitary, one-piece part. The turbulator insert member 252 may be made from and/or constructed from a number of materials, such as polymeric or composite material. In some embodiments, the turbulator insert member 252 may be constructed from a fiber-reinforced (e.g., glass-reinforced) polymer (e.g., a polyamide material) that provides sufficient mechanical and thermal performance. The turbulator insert member 252 may be molded, machined, bent, shaped, or formed otherwise.

As shown in FIG. 3, the turbulator insert member 252 may be received within the outer housing member 162, within the coolant jacket 214. The insert member 252 and the internal surfaces defining the coolant jacket 214 (i.e., the radial internal surfaces 218, the axial internal surfaces 220, the circumferential internal surfaces 222, and/or the inner surface of the end cap 190) may be shaped to supplement each other. Accordingly, the insert member 252 may nest within the coolant jacket 214. The outer surfaces of the insert member 252 and the opposing internal surfaces of the outer housing member 162 may abut, overlie, layer over, or otherwise support each other.

Thus, the coolant jacket 214 is defined at least partly by "first support surfaces" such as the radial internal surfaces 218, the axial internal surfaces 220 and the circumferential internal surfaces 222. The exterior surface of the insert member 252 defines corresponding "second support surfaces" that abut the "first support surfaces" to secure the turbulator insert member within the coolant jacket 214.

The insert member 252 may be received within the coolant jacket 214. As shown in FIGS. 5 and 6, the insert member 252 may be received within the first side portion 241 of the coolant jacket 214. The insert member 252 may be supported by and securely nested against the opposing internal surfaces of the coolant jacket 214.

For example, the insert member 252 may be disposed within the coolant jacket 214 with the end 265 and the axial branch 268 lying against, abutting, and supported in the circumferential direction by the first rail 208. In other words, the end 265 and axial branch 268 may face in the opposite circumferential direction from the first rail 208 to support the insert member 252 in one circumferential direction within the coolant jacket 214. Also, in some embodiments, a free end 279 of the first arcuate barrier member 254 may abut against the second rail 209 to be supported thereby in the other circumferential direction. Accordingly, the internal surfaces of the coolant jacket 214 may support the insert member 252 and limit relative rotation of the insert member 252 about the axis 102.

Furthermore, one or more of the radial internal surfaces 218 may be disposed at a taper angle 262 (FIG. 3) with respect to the axis 102. The taper angle 262 may be at least 0.5 degrees (0.5°). The exterior surface of the insert member 252 may face in the opposite direction as shown and may be disposed at a supplementary angle to the taper angle 262 so as to lie securely against the radial internal surface 218. In FIG. 3, one of the radial internal surfaces 218 facing inward toward the axis 102 is indicated at the taper angle 262. The opposing surface of the first arcuate barrier member 254 (i.e., the external surface facing outward away from the axis 102) may be disposed at a supplementary angle of the taper angle 262 with respect to the axis 102. Thus, if the taper angle 262 is, for example, disposed at 0.5 degrees (0.5°) from the axis 102, then the opposing surface may be disposed at one-hundred seventy-nine and one-half degrees (179.5°) from the axis 102. As shown, the inward-facing and outward-facing radial internal surfaces 218 may be tapered along with the opposing surfaces of the first and second arcuate barrier members 254, 256. Thus, the insert member 252 may be supported in the axial and radial directions (i.e., along the axis 102 and radially with respect to the axis 102).

Moreover, the turbulator insert member 252 may subdivide the coolant jacket 214 into a plurality of flow channels, flow paths, flow areas, etc. In effect, the insert member 252 may define barriers, dams, boundaries, etc. for directing the coolant along the flow path 206 through the coolant jacket 214 from the inlet 212 to the outlet 216. The turbulator insert member 252 may seal somewhat against the internal surfaces of the coolant jacket 214 to prevent leakage from one portion of the flow path 206 to another. Additionally, in some embodiments, the turbulator insert member 252 may be further sealed with an applied sealant (e.g., a suitable silicone sealant) to minimize the effect of flow through the gaps. In additional embodiments, the turbulator insert member 252 may fit more loosely against the internal surfaces of the coolant jacket 214 to allow some leakage between the portions of the flow path 206. However, the turbulator insert member 252 may direct the majority of the flow along the flow path 206. The coolant may be directed in a way that increases the cooling effect. Also, the turbulator insert member 252 may increase the amount of turbulence in the flow of coolant, thereby enhancing heat transfer into the coolant, etc.

Figure 9:
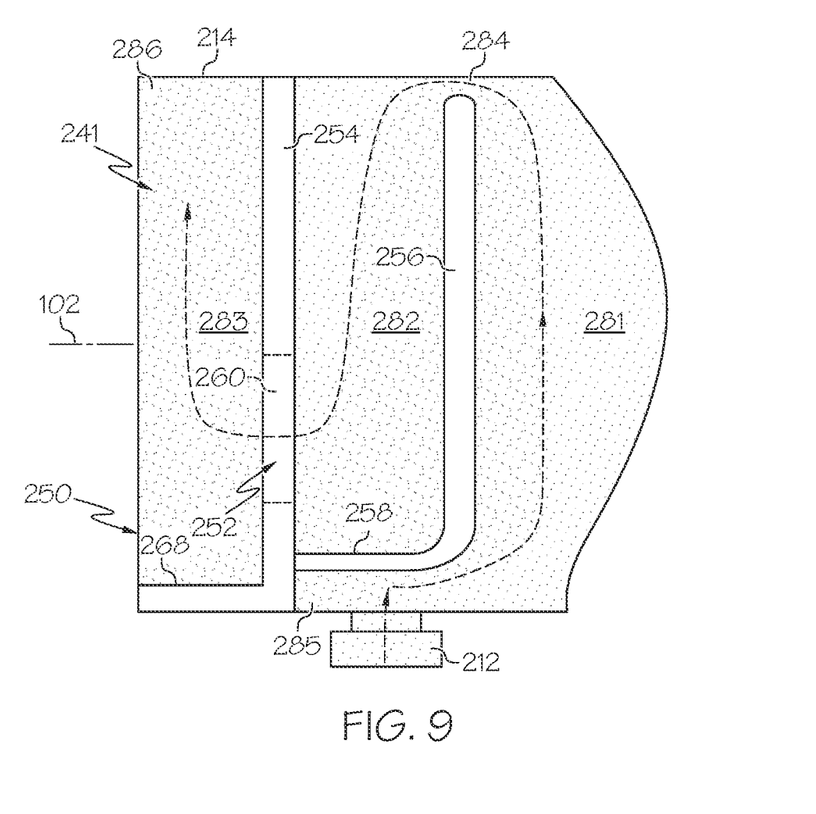
FIG. 9 is a top view of the turbulator insert member, which shows flow through the coolant jacket of the turbomachine of FIGS. 1-3 and 5-6.

In some embodiments, the turbulator insert member 252 may be received in the first side portion 241 of the coolant jacket 214 with the first arcuate barrier member 254 and the second arcuate barrier member 256 cooperatively sub-dividing the first side portion 241 of the coolant jacket 214 into a first arcuate passage 281, a second arcuate passage 282, and a third arcuate passage 283. The first, second, and third arcuate passages 281, 282, 283 may extend arcuately about the axis 102. These arcuate passages 281, 282, 283 may be arranged in sequence such that the second arcuate passage 282 is disposed downstream of the first arcuate passage 281 and the third arcuate passage 283 is disposed downstream of the second arcuate passage 282 along the flow path 206. Also, as shown in FIGS. 8 and 9, the second arcuate barrier member 256 may be spaced arcuately from the second rail 209 to thereby define a turn 284 in the flow path 206 that fluidly connects the first and second arcuate passages 281, 282. Furthermore, the aperture 260 of the insert member 252 may fluidly connect the second arcuate passage 282 and the third arcuate passage 283.

Also, the insert member 252 may be disposed in the first side portion 241 with the inlet 212 circumferentially positioned between the spine 258 (i.e., an axial barrier member) and the first rail 208 (i.e., an axial wall). Accordingly, the spine 258, part of the first arcuate barrier member 254, and the first rail 208 may define an inlet passage 285 of the coolant jacket 214. The inlet passage 285 may be fluidly connected to the inlet 212 to receive coolant flow therefrom. The inlet passage 285 may also be fluidly connected to the first arcuate passage 281 to provide coolant flow thereto. Also, the spine 258 may separate the second arcuate passage 282 from the inlet passage 285.

Thus, coolant from the inlet 212 may flow into the inlet passage 285. The coolant may flow axially along the flow path 206 from the inlet passage 285 and turn in the circumferential direction as the coolant flows into the first arcuate passage 281. From there, the coolant may move through the turn 284, flow in the opposite circumferential direction and through the second arcuate passage 282 toward the spine 258. Then, the coolant may move axially through the aperture 260 and into the third arcuate passage 283. Here, the flow path 206 may move in the circumferential direction toward a gap 286 defined axially between the second rail 209 and the end cap 190. The coolant within the third arcuate passage 283 may flow through the gap 286 and into the second side portion 242 of the coolant jacket 214. The outlet 216 may be fluidly connected to the second side portion 242 for receiving the coolant flow therefrom. As such, the coolant may flow through the motor section 105 and provide effective cooling.

It will be appreciated that the coolant flow path 206 may be configured otherwise without departing from the scope of the present disclosure. The turbulator insert member 252 may shaped in a number of ways for directing the coolant flow path 206 in a predetermined manner. Also, the turbulator insert member 252 may be removably positioned within the coolant jacket 214. In some embodiments, one insert member 252 may be replaced by another for repair and/or for selectively changing the flow path 206 through the coolant jacket 214.

Furthermore, it will be appreciated that the turbulator makes the flow path 206 more of a tortuous path, for example, through the first side portion 241 of the coolant jacket 214. The turbulator insert member 252 may increase the amount of time that the coolant remains within the first side portion 241 of the coolant jacket 214. Flow within the first side portion 241 may be relatively turbulent. Accordingly, the cooling effect may be increased.

In some embodiments, the shape, location, position, configuration, etc. of the turbulator insert member 252 may be tailored and selected according to particular features of the turbomachine 100. The flow path 206 may be directed to cool certain components, certain areas that need cooling, etc. For example, as shown in FIGS. 5 and 6, the turbulator insert member 252 may be configured for cooling a controller unit 288 of the turbomachine 100. Although schematically shown, it will be appreciated that the controller unit 288 may include one or more circuit boards, IC chips and other circuitry elements, wiring, etc. as well as a controller housing and other support elements. The controller unit 288 may be in communication with the ECU 150 (FIG. 1) and may be operable therewith. The controller unit 288 may operate and control certain functions of the motor 108. For example, the controller unit 288 may control the speed of the motor 108. As shown in FIGS. 5 and 6, the controller unit 288 may be supported on the outer housing member 162, proximate (e.g., above) the first side portion 241 of the coolant jacket 214. Stated differently, the first side portion 241 may be disposed between the controller unit 288 and the second side portion 242 in the radial direction. Thus, heat generated by the controller unit 288 can transfer effectively to the coolant moving through the first side portion 241 of the coolant jacket 214, and as explained, the turbulator insert member 252 may increase the cooling effect through this first side portion 241.

Thus, it will be appreciated that the cooling system 250 provides effective cooling. The cooling system 250 may be incorporated in the turbomachine 100 without significantly increasing the size and weight thereof. Accordingly, the turbomachine 100 may be compact and lightweight. Additionally, the turbomachine 100 may be manufactured efficiently to include the cooling system 250.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A turbomachine comprising:
 a fluid compressor section with a compressor wheel supported on a shaft and a compressor housing that houses the compressor wheel for rotation therein about an axis of rotation;
 an e-machine section with an e-machine operatively connected to the shaft and configured to convert energy between the e-machine and the shaft as the shaft rotates, the e-machine section including an e-machine housing that houses at least part of the e-machine;
 a coolant jacket that is defined at least partly in the e-machine housing by a first support surface, the coolant jacket configured to receive a fluid coolant flow therein for cooling the e-machine; and
 a turbulator insert member that includes a second support surface and that is removably received within the coolant jacket, the second support surface abutting the first support surface to secure the turbulator insert member within the coolant jacket, the first support surface and the second support surface facing in opposite circumferential directions with respect to the axis of rotation, the turbulator insert member sub-dividing the coolant jacket for directing the fluid coolant flow through the coolant jacket.

2. The turbomachine of claim 1, wherein the e-machine is an electric motor.

3. The turbomachine of claim 1, wherein the first support surface and the second support surface face in opposite radial directions with respect to the axis.

4. The turbomachine of claim 3, wherein the first support surface and the second support surface are tapered at supplementary angles with respect to the axis of rotation.

5. The turbomachine of claim 1, wherein the turbulator insert member includes a first arcuate barrier member and a second arcuate barrier member that are elongate and that extend arcuately about the axis of rotation, the first arcuate barrier member and the second arcuate barrier member being spaced apart at a distance along the axis of rotation.

6. The turbomachine of claim 5, wherein the turbulator insert member is received in the coolant jacket with the first arcuate barrier member and the second arcuate barrier member cooperatively sub-dividing the coolant jacket into a first arcuate passage, a second arcuate passage, and a third arcuate passage.

7. The turbomachine of claim 6, wherein the turbulator insert member includes an axial barrier member that is elongate and that extends between the first arcuate barrier member and the second arcuate barrier member, the axial barrier member separating the second arcuate passage from an inlet passage of the coolant jacket.

8. The turbomachine of claim 7, wherein the coolant jacket includes an axial wall that extends axially along the axis of rotation, and wherein the axial barrier member and the axial wall cooperate to define the inlet passage.

9. The turbomachine of claim 8, wherein the axial wall separates a first side of the coolant jacket from a second side of the coolant jacket, the first side and the second side disposed on opposite sides of the axis of rotation;
wherein the coolant jacket includes a fluid inlet and a fluid outlet, wherein the fluid inlet is in communication with the inlet passage of the coolant jacket; and
wherein the fluid outlet is in communication with the second side of the coolant jacket.

10. The turbomachine of claim 1, wherein the turbulator insert member includes a barrier member with an aperture configured to provide passage of the coolant flow through the barrier member.

11. The turbomachine of claim 1, wherein the turbulator insert member branches along a plurality of branches, at least one of the plurality of branches extending along a branch axis, the branch axis having a cross sectional profile with at least one flat side.

12. The turbomachine of claim 1, wherein the turbulator insert member branches along a plurality of branches, at least one of the plurality of branches extending along a branch axis, the branch axis having a cross sectional profile that is at least partly rounded.

13. A motorized compressor device comprising:
a fluid compressor section with a compressor wheel supported on a shaft and a compressor housing that houses the compressor wheel for rotation therein about an axis of rotation;
a motor section with an electric motor operatively connected to the shaft and configured to drivingly rotate the shaft, the motor section including a motor housing that houses at least part of the electric motor;
a coolant jacket that is defined at least partly in the motor housing, the coolant jacket configured to receive a fluid coolant flow therein for cooling the electric motor, the coolant jacket being defined by a first support surface and a third support surface; and
a turbulator insert member that is removably received within the coolant jacket and that sub-divides the coolant jacket for directing the fluid coolant flow through the coolant jacket, the turbulator insert member including a second support surface and a fourth support surface, the second support surface abutting the first support surface and the fourth support surface abutting the third support surface to secure the turbulator insert member within the coolant jacket, the first and second support surfaces facing in opposite radial directions with respect to the axis, and the third and fourth support surfaces facing in opposite circumferential directions with respect to the axis.

14. A turbomachine comprising:
a fluid compressor section with a compressor wheel supported on a shaft and a compressor housing that houses the compressor wheel for rotation therein about an axis of rotation;
an e-machine section with an e-machine operatively connected to the shaft and configured to convert energy between the e-machine and the shaft as the shaft rotates, the e-machine section including an e-machine housing that houses at least part of the e-machine;
a coolant jacket that is defined at least partly in the e-machine housing by a first support surface, the coolant jacket configured to receive a fluid coolant flow therein for cooling the e-machine; and
a turbulator insert member that includes a second support surface and that is removably received within the coolant jacket, the second support surface abutting the first support surface to secure the turbulator insert member within the coolant jacket, the first support surface and the second support surface facing in opposite radial directions with respect to the axis of rotation, the first support surface and the second support surface being tapered at supplementary angles with respect to the axis of rotation, the turbulator insert member sub-dividing the coolant jacket for directing the fluid coolant flow through the coolant jacket.

15. The turbomachine of claim 14, wherein the turbulator insert member includes a first arcuate barrier member and a second arcuate barrier member that are elongate and that extend arcuately about the axis of rotation, the first arcuate barrier member and the second arcuate barrier member being spaced apart at a distance along the axis of rotation.

16. The turbomachine of claim 15, wherein the turbulator insert member is received in the coolant jacket with the first arcuate barrier member and the second arcuate barrier member cooperatively sub-dividing the coolant jacket into a first arcuate passage, a second arcuate passage, and a third arcuate passage.

17. The turbomachine of claim 16, wherein the turbulator insert member includes an axial barrier member that is elongate and that extends between the first arcuate barrier member and the second arcuate barrier member, the axial barrier member separating the second arcuate passage from an inlet passage of the coolant jacket.

18. The turbomachine of claim 17, wherein the coolant jacket includes an axial wall that extends axially along the axis of rotation, and wherein the axial barrier member and the axial wall cooperate to define the inlet passage.

19. The turbomachine of claim 18, wherein the axial wall separates a first side of the coolant jacket from a second side of the coolant jacket, the first side and the second side disposed on opposite sides of the axis of rotation;
wherein the coolant jacket includes a fluid inlet and a fluid outlet, wherein the fluid inlet is in communication with the inlet passage of the coolant jacket; and wherein the fluid outlet is in communication with the second side of the coolant jacket.

20. The turbomachine of claim 14, wherein the turbulator insert member includes a barrier member with an aperture configured to provide passage of the coolant flow through the barrier member.

\* \* \* \* \*